June 17, 1969  C. D. HANAWAY  3,449,992

MANUALLY-HELD POWER-DRIVEN PIPE CUTTER

Filed March 2, 1967

INVENTOR.
CHARLES D. HANAWAY

BY Woodard, Weikart, Emhardt & Naughton
Attorneys

United States Patent Office 3,449,992
Patented June 17, 1969

3,449,992
MANUALLY-HELD POWER-DRIVEN PIPE CUTTER
Charles D. Hanaway, Indianapolis, Ind.
(R.R. 1, Butlerville, Ind. 47223)
Filed Mar. 2, 1967, Ser. No. 620,116
Int. Cl. B26d 7/02, 1/18, 5/10
U.S. Cl. 83—455
2 Claims

ABSTRACT OF THE DISCLOSURE

A pipe or bar cutting machine of compact construction having a main frame and a secondary frame with gripping surfaces on both frames and the secondary frame guided and movable on the main frame by a screw adjustment for clamping a work piece. An electric motor with a convenient grip and trigger slidably mounted in the main frame and driving a rotary cutter also slidably mounted in a frame to move the cutter through a work piece clamped between the gripping surfaces of the frames. The frames are conveniently portable by reason of their attachment to the motor and the convenient hand grip on the motor.

BACKGROUND OF THE INVENTION

Field of the invention

The invention pertains to cutlery and more particularly to pipe and bar cutters which are power-driven, approaching the work piece from the exterior thereof and cutting it across its length into several pieces. Built-in clamping means are incorporated for convenience, accuracy, and safety.

Description of the prior art

Known prior art devices for pipe and bar cutting typically employed a cutting member which is revolved around the exterior of the work piece as the cutting member rotates on the machine or, if power-driven, as the cutter is rotated by the drive motor. Power-driven versions require a great deal of space and can hardly be considered portable and certainly comparatively inconvenient even if portable. There remains a need for a cutter which can be brought to the work piece in one direction, clamped on, and driven through the work piece without rotating the cutter around the work piece and without danger of the cutter and machine being thrown off the work piece or vice versa during operation.

SUMMARY OF THE INVENTION

Described briefly, a typical embodiment of the present invention incorporates a main frame having one work piece clamping surface thereon near one end thereof and facing away from that end. A secondary or sub-frame is mounted on the main frame and has a clamping surface thereon facing that on the main frame. The secondary frame can be advanced toward and retracted away from the clamping surface of the main frame by means of a screw threadedly received in a portion of the main frame. A drive motor is slidably mounted in the main frame and secondary frame and has a handle grip extending therefrom at the end opposite the clamping surface end of the main frame. A rotary cutter is slidably mounted in the secondary frame and connected to the drive motor whereby it is rotated and can be pushed linearly into and through a work piece clamped between the clamping surfaces by simply holding the motor hand grip and pushing it toward the clamping surface of the main frame. The whole unit is readily portable by simply carrying it by the hand grip of the drive motor.

BRIEF DESCRIPTION OF DRAWING

The full nature of the invention will be understood from the accompnaying drawings and the following description and claims.

DESCRIPTION OF THE PREFERRED EMBODIMENTS

Figure 1:
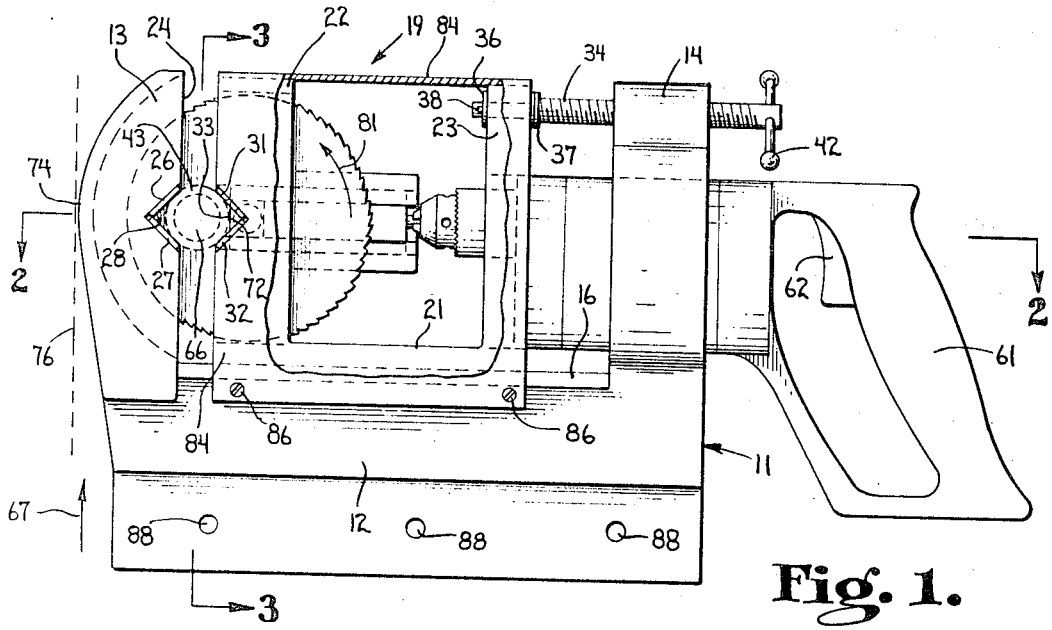
FIG. 1 is a side elevational view of a typical embodiment of the present invention.

Referring now to the drawings in detail, the illustrated embodiment of the present invention includes a main frame 11 having an elongated base portion 12 with an upstanding front end portion 13 and an upstanding rear end portion 14 to present a generally U-shaped configuration when viewed from the side. The main frame has a pair of elongated guide plates 16 and 18 affixed thereto and receiving the secondary frame 19 thereon. The secondary frame is also generally U-shaped when viewed from the side including a base portion 21 and an upstanding front end portion 22 and an upstanding rear end portion 23.

The front end portion 13 of the main frame has a horizontally extending recess in the rear face 24 thereof and face plates 26 and 27 are affixed to the portion 13 to provide a generally V-shaped notch 28 facing toward the rear end of the main frame and away from the front end thereof. Similarly a recess is provided in the front face 29 of the secondary frame and plates 31 and 32 are provided in this recess being affixed to the portion 22 and providing a notch 33 facing the notch 28.

Figure 3:
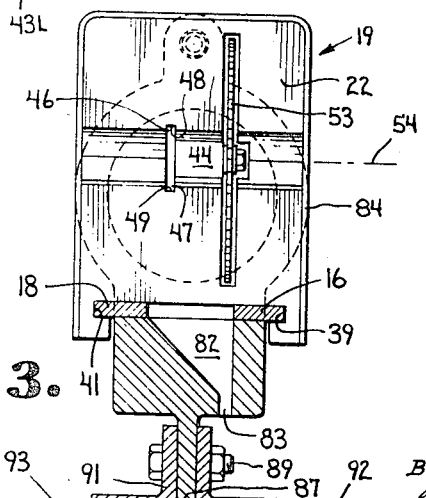
FIG. 3 is a vertical section taken along the line 3—3 in FIGURE 1 and viewed in the direction of the arrows.

A clamping screw 34 is threadedly received in the main frame portion 14 and is rotatable in the secondary frame portion 23, the latter being secured between the washers 36 and 37 of the screw, washer 36 being retained by a cotter pin 38. Because the horizontally extending grooves 39 and 41 (FIG. 3) in the secondary frame are slidingly received on the main frame plates 16 and 18, respectively, the secondary frame can be moved forward toward main frame portion 13 or rearward away therefrom by rotating the clamping screw 34, which can be conveniently done by manual manipulation of the handle 42. In this way a work piece illustrated in the form of a pipe or tube 43 can be gripped between the facing surfaces of the face plates mounted to the main and secondary frames. Although the work piece shown in the form of a pipe having a circular cross section, the work piece can have any of a variety of cross sectional configurations and can be solid as well as hollow.

A slide 44 is mounted in the secondary frame by means of the horizontally extending flanges 46 at the top and 47 at the bottom of the slide being received in the grooves 48 and 49 respectively of the secondary frame.

This slide has an input shaft 51 in the rear end thereof and an output shaft 52 near the front end thereof and at right angles to the input shaft axis. This output shaft receives a circular cutter 53 mounted thereon for rotation on the output shaft axis 54 as the input shaft 51 is driven on its axis 56. Thus the slide provides a right angle drive for the cutter 53, the latter being shown in the form of a saw although other types of cutting members and materials other than steel for the cutter may also be used.

The drive motor incldes a cylindrical housing 57 slidingly received in a cylindrical bore 58 in the main frame portion 14 and in a cylindrical bore 59 in the secondary frame portion 23. This motor has a convenient hand grip 61 with motor operating trigger 62 and an adjustable chuck 63 on the output shaft thereof is clamped onto the input shaft 51 of the right angle drive slide 44. So it is that when the motor is operated by pulling the trigger, the cutter is rotated on the axis 54.

In the use of the machine to cut a tube, for example, the whole machine may be advanced in the direction of the arrow 64 to the vicinity of the pipe 43 whereupon the machine is raised with the screws 34 turned rearwardly enough for the space 66 to admit the pipe as the front end is raised in the direction of the arrow 67 to locate the pipe between the facing gripping surfaces. Then the screw 42 is advanced in the number 14 to clamp the pipe between the jaws as shown in FIGURE 1. At this time the slide 44 is in a rearward position as is the motor, with the slide abutment surface 68 abutting the stop 69 secured in the secondary frame by the screw 71. With the pipe clamped in the jaws, the motor is started by pulling the trigger and as the motor is pushed forward in the direction of the arrow 64, the cutter engages the pipe surface at 72 and proceeds to cut straight through the pipe as the motor is pushed still further in the direction of the arrow 64 toward the face plates 26 and 27. When the cutter has passed completely through the pipe, the motor can be withdrawn toward the rear either before or after releasing the trigger and, after releasing the trigger the clamping screw 34 can be withdrawn to release the pipe. The machine can conveniently be carried to the next location where a cut is to be made by simply using the hand grip 61 at the rear end of the motor, because the chuck 63 is clamped on the input shaft 51 of the slide which will not pull out of its grooves because of the provision of the stop 69.

As shown in the drawing, a suitable clearance space 73 is provided in the front end portion 13 of the main frame to admit the cutter even when the pipe is so small that the space between the surfaces 24 and 29 of the two frames is virtually nil. The length of the front portion 13 of the main frame between the surface 24 and the front end 74 thereof is minimized in order to permit using the tool on a pipe which may be mounted very close to a wall surface and the front end 74 is the forwardmost portion of the entire machine. It is just ahead of the farthest the saw blade can advance and in this way will avoid getting the cutter into a wall surface, for example, in the event a pipe is being cut very close to a wall line which may be indicated, for example, at the dotted line 76. So it is that the present invention enables the use of a powered cutter on existing pipe installations where even the manual cutters heretofore available could not be used.

Figure 2:
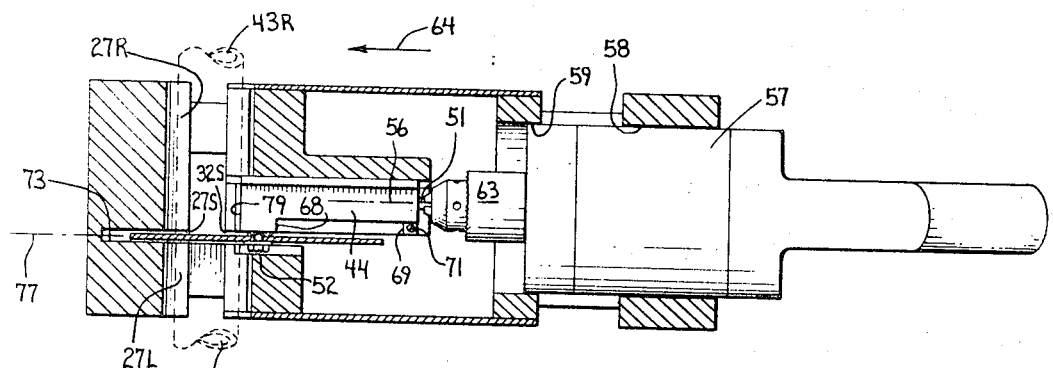
FIG. 2 is a section therethrough taken along the line 2—2 in FIGURE 1 and viewed in the direction of the arrows.

Another feature of the present invention is the fact that the face plates 26 and 27 and 31 and 32 extend to both sides of the cutter. For example, as indicated in FIGURE 2 the plate 27 has a portion 27L at the left of the plane 77 of the cutter and a portion 27 are at the right of the plane 77 of the cutter. The space 27S between these plates admits the cutter during the cutting operation as the cutter is nearly through the pipe. Similarly the space 32S between the left and right-hand portions of the face plate 32 admits the cutter as it proceeds into and through the portion of the pipe which is first cut. Nevertheless, the two pipe portions 43L and 43R at both sides of the cut remain clamped between the face plates both before and after the pipe is cut into so that there is no binding of the pipe on the cutter at any time. During the cutting operation, the advance of the cutter is normally terminated by abutting engagement of the front end 79 of the slide with the pipe 43 or other work piece in the jaws.

Where the cutter is a steel saw blade with teeth disposed in the direction indicated, the normal rotation of the blade is in the direction of the arrow 81 so that the saw dust is discharged downwardly and for this purpose a convenient hopper type passageway 82 in the main frame will permit discharge of saw dust through the outlet 83. A shield is provided over the secondary frame in the form of a generally U-shaped plate 84 secured thereto by screws 86. This U or channel shaped cover plate extends from the front end of the secondary frame to the rear end thereof.

In the event it is ever desirable to use the machine of the present invention as a stationary or bench-top installation for pipe or bar cutting, this can be conveniently done by the provision of the horizontally extending vertical flange 87 at the lower margin of the main frame and having the apertures 88 spaced therealong through which bolts 89 (FIGURE 3) can be passed for attaching this flange to angle sections 91 and 92 affixed to a table top 93.

A variety of materials may be useful in the practice of the present invention but for the main and secondary frames and the motor; aluminum may be found most suitable from the standpoint of lightweight and low-cost. The face plates of the jaws may be steel or brass and other materials may also be used and these are typically secured to the frames by screws so that they can be removed and replaced if and when desired. Other type of work piece receiving means may also be employed.

While the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

The invention claimed is:
1. A hand portable machine for cutting elongated workpieces, said machine comprising:
 a first frame having first workpiece seating means thereon;
 a second frame having second workpiece seating means thereon facing said first workpiece seating means and spaced therefrom, said second frame being movable on said first frame while said first seating means remains stationary on said first frame to increase and decrease the spacing between said seating means to receive and clamp workpieces between said seating means;
 a cutter mounted on one of said frames and movable thereon to move a portion of said cutter through a portion of said space to cut through a workpiece clamped between said seating means;
 and a motor mounted to one of said frames and coupled to said cutter and driving said cutter,
 said cutter being disposed and operable in a cutting plane,
 said first frame having an elongated guide portion and having an end portion extending transverse to said guide portion at a front end thereof, with said first seating means mounted to the rear of said end portion and facing toward the rear end of said guide portion,
 the front of said end portion being proximate said first seating means and being the forwardmost portion of said machine, said second seating means being mounted on the front of said second frame, and said second frame being guidingly mounted on said first frame guide portion behind said end portion for linear movement along said guide portion toward and away from said end portion to respectively clamp and unclamp a workpiece between said first and second seating means.

2. The machine of claim 1 and further comprising:

first guide means on said first frame and receiving said motor to permit linear movement of said motor on said first frame forward toward said first seating means;

a slide having said cutter thereon;

second guide means on said second frame and receiving said slide to permit linear movement of said slide on said second frame forward toward said first seating means;

said slide being disposed between said motor and said first seating means and movable forward toward said first seating means by moving said motor forward toward said first seating means;

said motor having a hand grip at the rear end facilitating movement of said motor, slide, and cutter in said frames for cutting a workpiece, and facilitating the transportation of said frames.

References Cited

UNITED STATES PATENTS

| | | | |
|---|---|---|---|
| 1,434,475 | 11/1922 | Austin | 83—455 |
| 1,618,585 | 2/1927 | Feister | 30—92 |
| 1,839,969 | 1/1932 | Kazanji | 83—454 |
| 2,248,642 | 7/1941 | Phillips | 30—92 |
| 2,973,576 | 3/1961 | Hentke | 30—92 |

FOREIGN PATENTS 386,468   4/1965   Switzerland.

JAMES M. MEISTER, *Primary Examiner.*

U.S. Cl. X.R.

30—92; 83—489, 574